United States Patent [19]

Fernandez et al.

[11] Patent Number: 5,448,938
[45] Date of Patent: Sep. 12, 1995

[54] REMOVABLE BALLISTIC RESISTANT ARMOR SEAT COVER AND FLOOR MAT

[75] Inventors: Joseph F. Fernandez, Vienna; Oliver L. North, Bluemont, both of Va.

[73] Assignee: Guardian Technologies International, Inc., Sterling, Va.

[21] Appl. No.: 137,362

[22] Filed: Oct. 18, 1993

[51] Int. Cl.⁶ ............................................. B64D 7/00
[52] U.S. Cl. .................................... 89/36.02; 89/36.11; 109/49.5; 244/121; 297/229; 297/DIG. 6
[58] Field of Search ............................ 89/36.02, 36.11; 109/49.5; 244/121; 297/229, DIG. 6

[56] References Cited

U.S. PATENT DOCUMENTS

| | | | |
|---|---|---|---|
| 3,606,452 | 9/1971 | Riffe | 297/216 |
| 4,206,945 | 6/1980 | Kifferstein | 297/DIG. 6 |
| 4,989,266 | 2/1991 | Borgese et al. | 2/2.5 |
| 5,008,959 | 4/1991 | Coppage, Jr. et al. | 2/2.5 |
| 5,164,536 | 11/1992 | Babbaza | 89/36.11 |
| 5,180,880 | 1/1993 | Zufle | 89/36.02 |
| 5,200,256 | 4/1993 | Dunbar | 428/212 |
| 5,294,166 | 3/1994 | Shapland | 297/229 |
| 5,327,811 | 7/1994 | Price et al. | 89/36.05 |

OTHER PUBLICATIONS

Webster's Seventh New Collegiate Dictionary, "armor", 1969, p. 48.

*Primary Examiner*—Stephen C. Bentley
*Attorney, Agent, or Firm*—John J. Byrne

[57] ABSTRACT

A removable seat and floor coverlet for helicopters that are light in weight, easily removable and installed and that provide protection to the occupants from small arms fire from the ground. The cover protects not only the torso of the occupants, but also their legs. The coverlet can be easily stored, retrieved and then installed only when necessary.

1 Claim, 2 Drawing Sheets

REMOVABLE BALLISTIC RESISTANT ARMOR SEAT COVER AND FLOOR MAT

BACKGROUND OF INVENTION

Helicopter operators are assigned to a variety of missions. Most of these missions are safe and present no danger. For instance, helicopters are often utilized for point-to-point transportation of passengers, observation of traffic and weather, and myriad of rather mundane assignments. This is especially true of helicopters assigned to news organizations. However, these same helicopters and operators, are also sent on dangerous assignments, such as to observe riots, crimes, or other hazardous conditions where there is danger to the operators from fugitives, rioters, criminals, hostage takers and the like.

Protective devices for aircraft operators are known to the prior art. For instance, the Riffe patent U.S. Pat. No. 3,606,452 shows an armored vehicle seat adopted for aircraft use. Babbaza U.S. Pat. No. 5,164,536 discloses an armor resistant seat primarily utilizing ceramic-matrix composites as the ballistic resistant material. Dunbar U.S. Pat. No. 5,200,256 shows a variety of armored linings for use with vehicles of one sort or another.

SUMMARY OF THE PRESENT INVENTION

Prior art devices that afford protection to helicopter occupants primarily relate to of resistant armor devices that are relatively heavy and it must be remembered that fuel capacity and fuel expense are always considerations when dealing with helicopter missions. In the vast majority of instances wherein there are no hazardous or dangerous conditions, it is desirable to maintain the lowest weight possible. Regularly designed helicopter seats are particularly designed to provide comfort and a light weight. It is an important objective of this invention to preserve these desirable characteristics for normal missions while providing ballistic resistant capacity for high risk missions.

Therefore, a principal objective of this invention is to preserve the integrity of the originally designed helicopter seat, while providing the ability to armor proof its cab on short notice.

Another objective of this invention is to provide an armor resistance cover with rapid securement by way of VELCRO combinations such as hook and loop tape fasteners to its seat, floorboard and/or deck of the aircraft.

Another objective of this invention is to provide for the above identified protection during hazardous missions with a relatively light-weight flexible structure that is comfortable for the operator's use.

Another important objective is to provide a cover of the type described which resists deterioration and decay.

A still further objective of the invention is to provide an armor resistant coverlet of the type described which does not absorb perspiration or retain body odors and, in fact, does not lose its effectiveness when it becomes wet.

In many hazardous conditions, the rioters or criminals being observed have automatic weapons which will cause multiple close strikes against the armor resistance device. A still further objective of this invention is to provide good protection against multiple hits and angle shots from projectiles.

Another important objective of the invention is to provide a helicopter seat cover and floor mat combination which can be used with most helicopter interiors, but can also be custom-crafted for any specified aircraft dimensions and configuration.

Another important objective of this invention is to provide a seat-mat cover so that the cover extends across the back, across the seat and across the floor for providing protection for the crew members' legs.

Further objectives and uses of the invention described herein will become more apparent, when read in light of the following description and claims taken with the drawings.

DESCRIPTION OF THE PREFERRED EMBODIMENTS OF THE INVENTION

Figure 1:
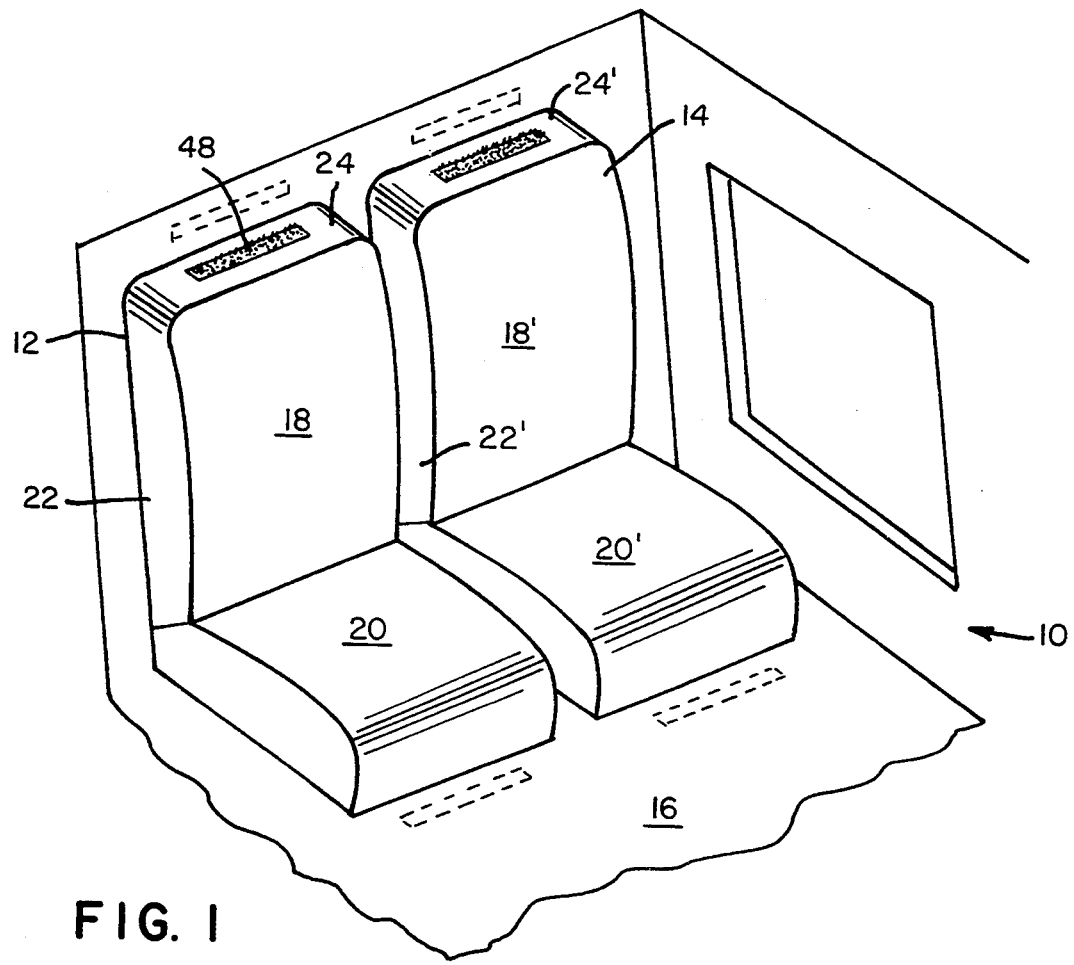
FIG. 1 is a diagrammatic perspective view showing a typical helicopter interior with a plurality of seats.

Specific terms are used in the following description for the sake of clarity. These terms are intended to refer to a particular structure of the invention selected for illustration in the drawings. They are not intended to define or limit the scope of this invention.

Referring now to the drawings wherein like elements are referred to by like numerals, the numerical 10 indicates the interior of a cab of a helicopter. Within the cab of the helicopter there are normally two seats, 12 and 14. Each of the seats are secured to the floor board 16 in conventional fashion, The seats are comprised of back rests 18 and 18' and seats 20 and 20'. The sides of the seats are indicated by the numerals 22 and 22' and the tops thereof by the numerals 24 and 24'. Although not shown, the backs 18 and 18' can be tilted forwardly or backwardly, depending on which is more comfortable to the helicopter occupant. However, it can generally be said that the back rests are perpendicular to the seat members and the seat members are generally parallel to the floor board 16.

Figure 5:
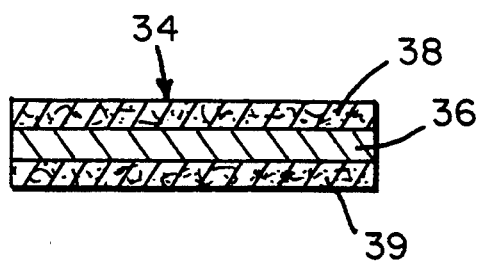
FIG. 5 is a cross section view along the line 5—5 shown in FIG. 2.
Figure 6:
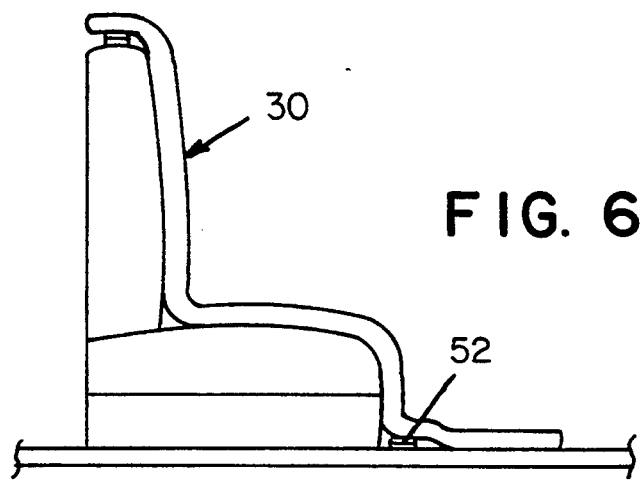
FIG. 6 is a side view of the blanket member shown in FIG. 2 disposed over a seat.

The main objective of this invention is to protect operators or passengers sitting in the seats from rifle fire or projectiles launched from the ground. For this purpose a ballistic armor structure or blanket 30 is provided for each chair. The blanket includes a flexible, durable cloth envelope 32 defining an interior chamber 33. Each chamber throughout its length and width, contains a ballistic resistant package 34 which normally consists of at least three packages of ballistic materials in excess of eight plies each. For instance, referring to FIG. 5, there is seen a package of SPECTRA SHIELD 36 sandwiched between two SPECTRA woven fabric packages 38 and 39.

The width of the envelope 32 is generally the same as the width of the seat members 12 and 14 and the ballistic packages extend throughout the length and width of chamber 33. The ballistic insert is flexible enough to assume the configuration shown in FIG. 3, that is: a back rest length 40, a seat portion length 42, a leg extension length 44 and a floor board length 46.

Returning now to FIG. 1, note that one strip 48 of a VELCRO combination is secured to the tops 22 and 24 of back rests 18. If desired the strip 48 can be secured to the bulkhead 50 if it is not desirable to secure it to the seat itself. See the dotted line position of FIG. 1. The VELCRO members normally will have the nub portion of the VELCRO combination on the seats or bulkhead and, as seen in FIGS. 2 and 3, the blanket is equipped with the hook components 49 of the VELCRO combination for meshing therewith.

Figure 4:
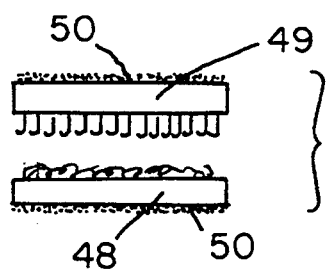
FIG. 4 is a representative drawing of the VELCRO members used in this invention.

As seen in FIG. 4, the VELCRO components come with an adhesive 50 on one side thereof, so that these members can be located in the proper locations by the user most appropriate for the design of the helicopter involved.

Figures 2, 3, 3A:
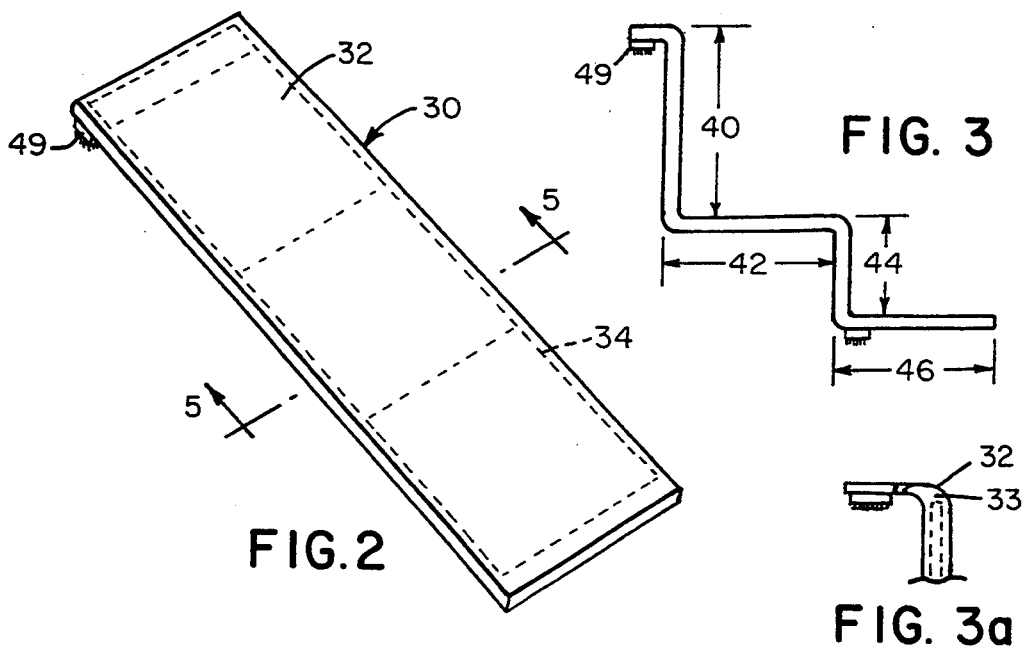
FIG. 2 is a perspective view of the protective ballistic resistent blanket of this invention.
FIG. 3 is a side elevation view of the member shown in FIG. 1.
FIG. 3a is a side elevation view of one portion of the structure shown in FIG. 3.

In the event a maximum threat level is expected, it may be advisable to utilize a blanket containing six or more ballistic packages that will not readily assume the shape shown in FIG. 3. In these instances ballistic inserts can be utilized that are divided into lengths respectively corresponding to a back rest length, a seat length, a leg extension length and a floor board length. The dimensions are generally indicated by the dotted lines in FIG. 2.

As seen in FIG. 3a, one end of the envelope is left free of ballistic material so that the strip 48 can be readily folded onto its interengaging strip 49.

If there is any stability problems whatsoever, a VELCRO interengagement combination can also be disposed between the floor mat length and the floor board as shown by the numeral 52.

The embodiment disclosed is the invention as presently contemplated. However, the reader should understand that various changes and modifications can be made without departing from the spirit of the present invention as described in the claims.

We claim:
1. In a helicopter cockpit, the combination comprising:
a floorboard;
a seat extending generally parallel to said floorboard;
a backrest extending upwardly from said seat;
a flexible elongated armor blanket having a width approximating the width of said backrest and said seat, and an overall length approximating the combined length of a backrest length, a seat length, a riser length determined by the distance between said seat and said floorboard, and a floorboard length extending forwardly of said seat;
said blanket divided lengthwise into a backrest chamber, a seat chamber, a riser chamber and a floorboard chamber;
a first fold line between said backrest chamber and said seat chamber, a second fold line between said seat chamber and said riser chamber and a third fold line between said riser chamber and said floorboard chamber;
VELCRO elements located on said seat and said blanket for readily securing and removing said blanket from said seat;
a first of said VELCRO elements secured adjacent said top of said seat and the second of which is secured to one longitudinal end of said blanket;
second VELCRO elements to secure said blanket at locations on said seat as selected by a user;
a plurality of three layer ballistic resistant inserts filling each of said chambers;
first and third layers of said insert comprised of multi-layered sets of SPECTRA woven fabric and the second of said layers comprised of a multi-layered SPECTRA SHIELD and sandwiched between said first and third layers;
whereby the relative stiffness of said inserts does not interfere with said blanket bending along said fold lines so that said insert can readily follow the contours of said backrest, said seat, and said floorboard.

* * * * *